US011726116B2

(12) United States Patent
Xu et al.

(10) Patent No.: US 11,726,116 B2
(45) Date of Patent: Aug. 15, 2023

(54) METHOD AND APPARATUS FOR ON-CHIP POWER METERING USING AUTOMATED SELECTION OF SIGNAL POWER PROXIES

(71) Applicant: Arm Limited, Cambridge (GB)

(72) Inventors: Xiaoqing Xu, Austin, TX (US); Zhiyao Xie, Durham, NC (US); Shidhartha Das, Upper Cambourne (GB)

(73) Assignee: Arm Limited, Cambridge (GB)

( * ) Notice: Subject to any disclaimer, the term of this patent is extended or adjusted under 35 U.S.C. 154(b) by 197 days.

(21) Appl. No.: 17/218,686

(22) Filed: Mar. 31, 2021

(65) Prior Publication Data

US 2022/0163576 A1      May 26, 2022

Related U.S. Application Data

(60) Provisional application No. 63/116,502, filed on Nov. 20, 2020, provisional application No. 63/116,496, filed on Nov. 20, 2020.

(51) Int. Cl.
| | |
|---|---|
| *G01R 21/133* | (2006.01) |
| *G06F 30/3308* | (2020.01) |
| *G05F 1/66* | (2006.01) |
| *G06F 30/367* | (2020.01) |
| *G01R 31/317* | (2006.01) |
| *G05B 13/02* | (2006.01) |

(Continued)

(52) U.S. Cl.
CPC ..... *G01R 21/133* (2013.01); *G01R 31/31727* (2013.01); *G05B 13/02* (2013.01); *G05B 15/02* (2013.01); *G05F 1/66* (2013.01); *G06F 30/3308* (2020.01); *G06F 30/367* (2020.01); *G06F 2119/06* (2020.01)

(58) Field of Classification Search
CPC ............ G01R 21/133; G01R 31/31727; G06F 30/367; G06F 30/3308; G06F 2119/06; G05B 13/02; G05B 15/02; G05F 1/66
See application file for complete search history.

(56) References Cited

U.S. PATENT DOCUMENTS

| | | | |
|---|---|---|---|
| 8,650,413 B2 * | 2/2014 | Bose | G06F 11/3096 713/340 |
| 10,909,283 B1 | 2/2021 | Wang et al. | |

(Continued)

OTHER PUBLICATIONS

Chapter 7 of Parr, Parr, E. A. ., & Parr, E. A. (E. A. (1993). Logic designer's handbook: circuits and systems (2nd ed.). Newnes. (Year: 1993).*

(Continued)

*Primary Examiner* — Feba Pothen
*Assistant Examiner* — Martin Walter Braunlich
(74) *Attorney, Agent, or Firm* — Leveque Intellectual Property Law, P.C.

(57) ABSTRACT

An integrated circuit includes a first circuit and a power meter coupled to the first circuit at selected proxy locations. The power meter includes circuitry for generating toggle data, such as signal transitions or signal levels, from signals at the proxy locations and combiner circuitry for combining the toggle data in a first time window with a set of weight value to produce a measure of power usage in the first circuit. The proxy locations and weight values are selected automatically based on simulated or emulated signals from a larger set of locations in the first circuit and associated power usage in the first circuit.

22 Claims, 7 Drawing Sheets

(51) Int. Cl.
    *G05B 15/02*      (2006.01)
    *G06F 119/06*     (2020.01)

(56) References Cited

U.S. PATENT DOCUMENTS

| | | |
|---|---|---|
| 2006/0277509 A1 | 12/2006 | Tung et al. |
| 2010/0268930 A1 | 10/2010 | Bose et al. |
| 2011/0047402 A1 | 2/2011 | Carney |
| 2012/0036375 A1 | 2/2012 | Pascual et al. |
| 2021/0109908 A1 | 4/2021 | Patil et al. |
| 2021/0158155 A1 | 5/2021 | Zhang et al. |

OTHER PUBLICATIONS

Chapter 8 of Parr, Parr, E. A. ., & Parr, E. A. (E. A. (1993). Logic designer's handbook: circuits and systems (2nd ed.). Newnes. (Year: 1993).*

Kim et al., Simmani: Runtime Power Modeling for Arbitrary RTL with Automatic Signal Selection. In Proceedings of the 52nd Annual IEEE/ACM International Symposium on Microarchitecture (MICRO '52). Association for Computing Machinery, New York, NY, USA, 2019, 1050-1062.

Zhou et al., PRIMAL: Power Inference using Machine Learning. In Proceedings of the 56th Annual Design Automation Conference 2019 (DAC '19). Association for Computing Machinery, New York, NY, USA, Article 39, 1-6.

* cited by examiner

METHOD AND APPARATUS FOR ON-CHIP POWER METERING USING AUTOMATED SELECTION OF SIGNAL POWER PROXIES

RELATED APPLICATIONS

This application claims the benefit of provisional application Ser. No. 63/116,496 filed Nov. 20, 2020 and titled 'METHOD AND APPARATUS FOR ON-CHIP POWER METERING USING AUTOMATED SELECTION OF SIGNAL POWER PROXIES', the entire content of which is hereby incorporated by reference herein.

This application also claims the benefit of provisional application Ser. No. 63/116,502 filed Nov. 20, 2020 and titled 'METHOD AND APPARATUS FOR POWER MEASUREMENT IN ELECTRONIC CIRCUIT DESIGN AND ANALYSIS', the entire content of which is hereby incorporated by reference herein.

This application is related to co-pending application titled 'METHOD AND APPARATUS FOR POWER MEASUREMENT IN ELECTRONIC CIRCUIT DESIGN AND ANALYSIS', and filed on even date herewith. The entire content of this application is hereby incorporated by reference herein.

BACKGROUND

The present disclosure relates to power monitor of digital electronic circuits. More particularly, the disclosure relates to automated selection of a subset of signals to be used as proxies for measuring power usage.

While the overall power usage of electronic device can be measured at the power source, the power usage of individual chips or chip modules is harder to measure. The power usage of a digital circuit may depend upon the electrical signals at hundreds of thousands of logic gates. Monitoring all of these signals is not practical.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding or analogous elements.

DETAILED DESCRIPTION

Figure 1:
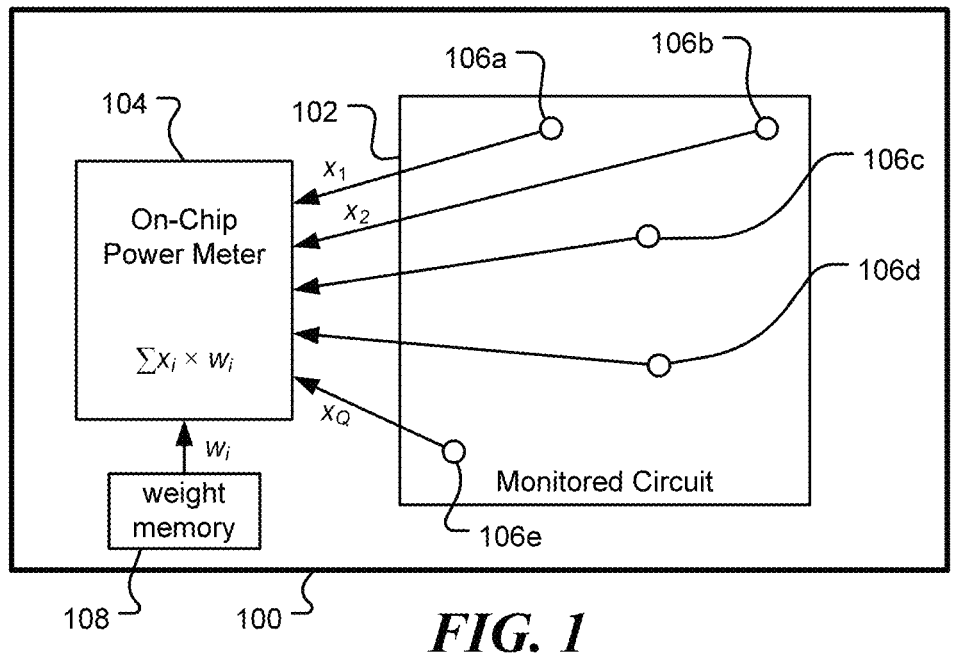
FIG. 1 is a diagrammatic representation of an integrated circuit including an on-chip power meter (OPM), in accordance with various representative embodiments.

The various apparatus and devices described herein provide mechanisms for automated design of an on-chip power meter (OPM) for digital electronic circuits.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

An embodiment of the disclosure provides a method for automatic synthesis of an on-chip power meter. In the method, a computer readable specification of a first electronic circuit is processed in a computer simulation, to predict a set of electrical signals and corresponding electrical powers in the first electronic circuit in a plurality of time windows. From the set of predicted electrical signals and corresponding electrical powers, a subset of electrical signals is automatically selected. These signals are indicative of the electrical powers in the first electronic circuit. Next, from the computer readable specification of first electronic circuit and the selected subset of signals, a second electronic circuit comprising is synthesized. This circuit includes both the first electronic circuit and a power meter circuit that measures electrical signals at the subset of registers.

The functionality of digital circuit may be specified, for example, by instructions of a register transfer language (RTL). RTL expresses, in a symbolic form, the sequence of operations among registers of a digital module. The RTL instructions may be input to an automated design or fabrication process that interprets the instructions and creates digital hardware that implements the described functionality or logic. The RTL description may be used in a simulator to produce the electrical signals. Alternatively, a binary code may be generated and run on an emulator to produce the electrical signals.

The functionality of digital circuit may be specified by instructions of a C/C++/SystemC programming language, for example, which is further translated into the RTL form using a high-level synthesis tool.

The RTL instructions may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

The electrical signals may be sequences of toggle activities or signal levels. These may be derived from clock logic sequences in which, for example, a "1" denotes a high logic voltage and a "0" denotes a low logic voltage. In the derived sequence of toggle activities, a '1' may be used to denote a transition from high to low or low to high, while a '0' denotes no transition.

An embodiment includes automatic generation of an on-chip power meter (OPM) using extracted power proxies, such as RTL signals and corresponding powers resulting from computer simulation or emulation of a workflow.

Previously, power monitoring is achieved using manually selected architectural or micro-architectural counters from CPU cores. This approach requires CPU design insights and careful power correlation exercise. In contrast, in the disclosed method, an on-chip power meter (OPM) is generated automatically from a linear or non-linear power model.

In particular, embodiments of disclosure provide automatic design of an on-chip power meter (OPM) using a set of power proxies and their corresponding coefficients. Identification of the power proxies and coefficients is based on signal and power data from an automated power modelling methodology. The OPM is configurable in terms of the number of power proxies, the coefficient values, the bit quantization of each coefficient, and power measurement window size.

In one embodiment, the OPM for per-cycle power monitoring is implemented using 1-bit counters, AND gates and adders, without using multipliers. An OPM for multi-cycle average power monitoring can be implemented by cascading a per-cycle OPM implementation, a shifter, and an adder. Alternatively, the OPM for multi-cycle average power monitoring can be implemented using multi-bit counters, multipliers and adders.

FIG. 1 is a diagrammatic representation of an integrated circuit including an on-chip power meter in accordance with embodiments of the disclosure. The chip or integrated circuit 100 includes a primary circuit 102 and a power meter circuit 104. The power meter circuit 104 receives signals from the primary circuit at circuit locations 106a-106e. Toggle data, $\{x_i\}$, are derived from these sequences. The power meter is configured to produce the power P in each clock cycle as a weighted sum of the toggle data, $\{x_i\}$, using their corresponding weights or coefficients, $w_i$.

The power is estimated from data derived a set of proxy signals, referred to as power proxies. In one embodiment the power is estimated from toggling activities of the set of proxy signals. In a further embodiment, the power is estimated from signal levels of the proxy signals, which contain similar information. It will be apparent to those of ordinary skill in the art that data derived from the proxy signals in other ways may be combined to estimate the power in the primary circuit. Herein, the terms "toggle data" shall refer to any data derived from the proxy signals and, in particular, shall include both signal transition data (where, for example, "1" denotes a signal change in a clock cycle and "0" denotes no change) and signal level data (where, for example, "1" denotes a first signal level and "0" denotes a second signal level).

In the example shown in FIG. 1, the power meter uses a linear model with Q power proxies for power prediction, e.g., $P=\sum_{i=1}^{Q} w_i * x_i$. The input vector for each clock cycle consists of the toggling activities of Q power proxies, which is encoded as a binary vector. This means, for the runtime power prediction, instead of using multipliers, the proposed OPM for per-cycle power tracing can be implemented with AND gates and adders.

Figure 2:
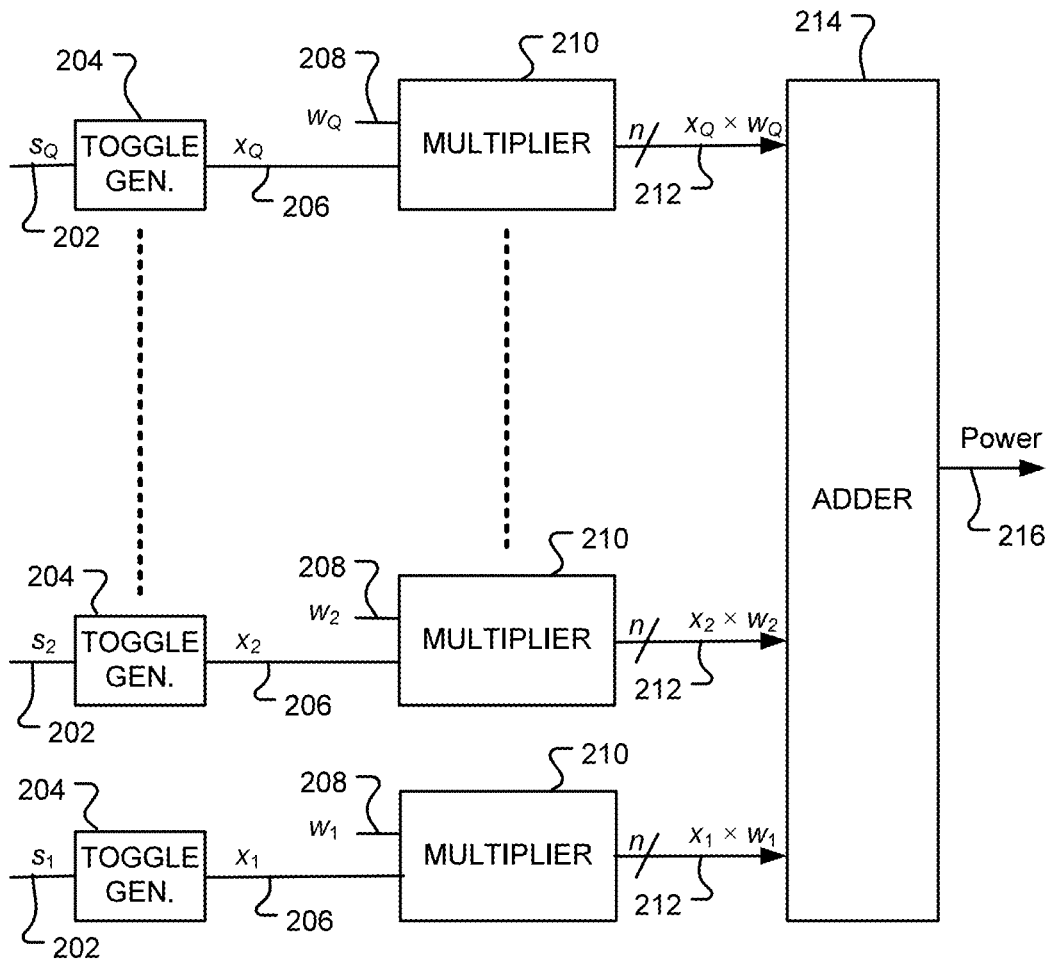
FIG. 2 is a block diagram of a power meter in accordance with various representative embodiments.

FIG. 2 is a block diagram of a power meter 200 in accordance with embodiments of the disclosure. In FIG. 2, logic signals $\{s_i\}$ (202) are input to toggle generators 204 to produce toggle data, $\{x_i\}$ (206). The toggle data, $\{x_i\}$ are combined with the weight values $w_i$ (208) in multipliers 210. The multi-bit outputs 212 from multipliers 210 are combined in adder 214 to provide the power estimate $P_k$ (216) in each clock cycle k.

Figure 3:
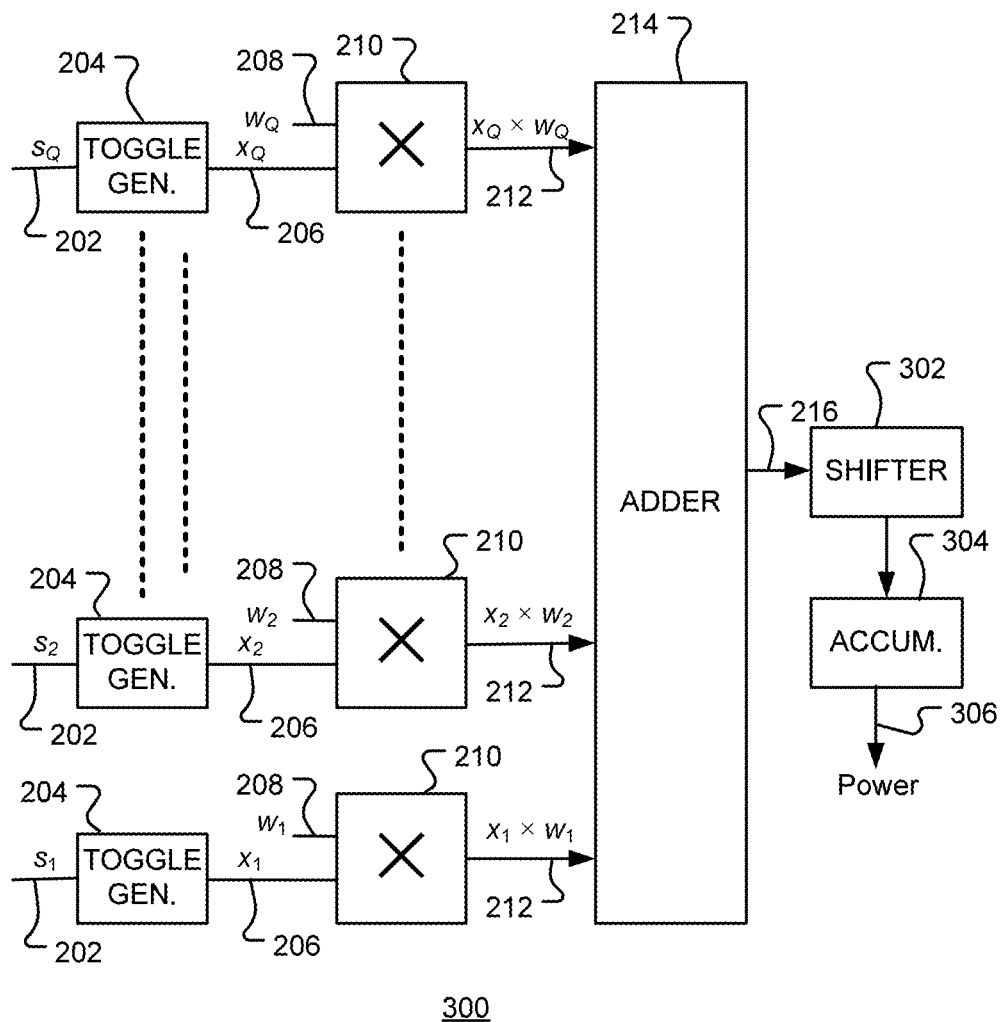
FIG. 3 shows an extension of the per-cycle OPM implementation, for the measurement of power averaged over $2^m$ cycles, in accordance with various representative embodiments.

FIG. 3 shows an extension of the per-cycle OPM implementation 300, discussed above, to the measurement of power averaged over $2^m$ cycles, in accordance with embodiments of the disclosure. In OPM 300 shown in FIG. 3, the power estimates $P_k$ (216) are divided by a factor $2^m$ in bit shifter 302 and then accumulated over $2^m$ cycles in adder 304 to produce the average power 306. In a further implementation, the steps of dividing and accumulating are reversed.

Figure 4:
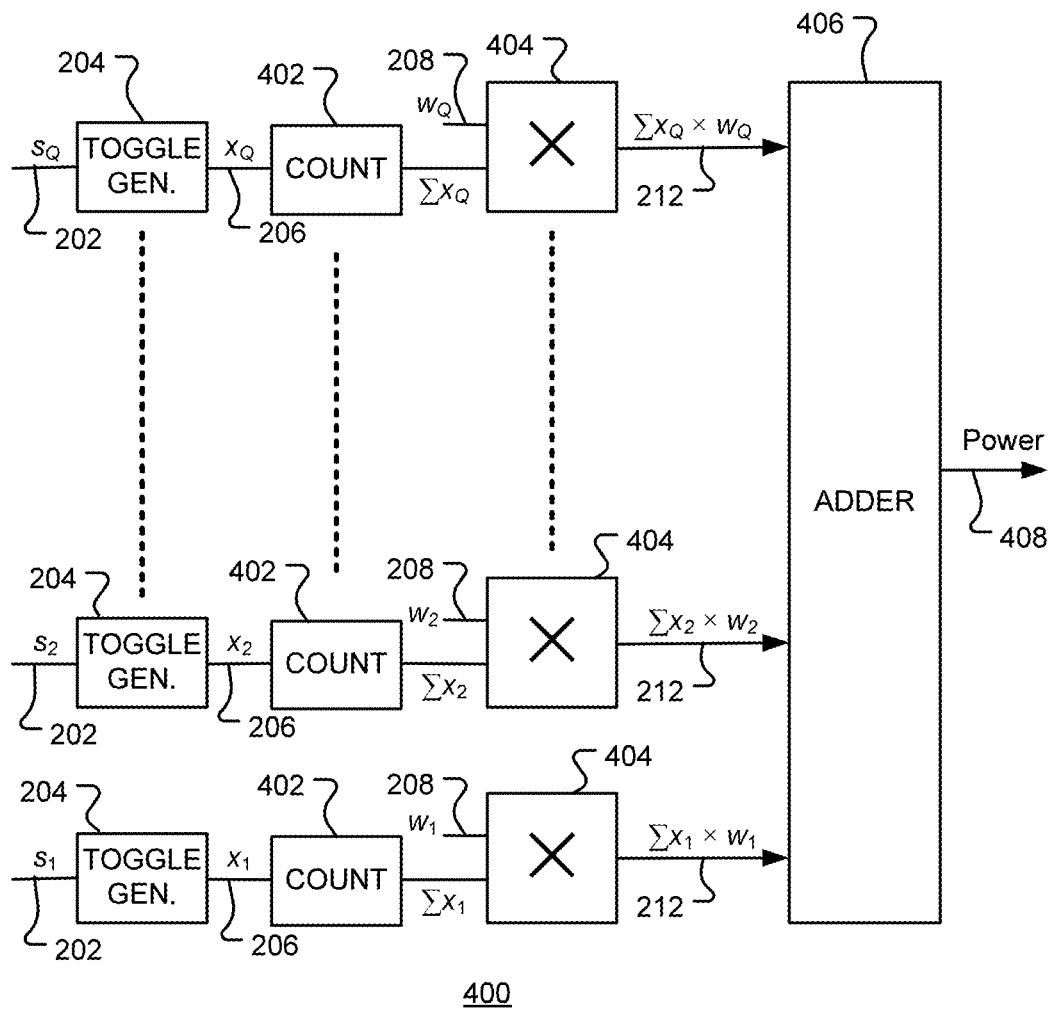
FIG. 4 is a block diagram of a further implementation of an OPM for the measurement of power averaged over $2^m$ cycles.

FIG. 4 is a block diagram of a further implementation of an OPM 400 for the average power monitoring over $2^m$ cycles. In FIG. 4, logic signals $\{s_i\}$ (202) are input to toggle generators 204 to produce toggle data $\{x_i\}$ (206). The toggle data are input to m-bit counters 402 to produce aggregated toggle data. The use of $2^m$-bit counters, enables the total number of toggles, $x_j$, to be counted for each signal. These values are multiplied by corresponding weights $\{w_i\}$ using multipliers 404. After adding the contributions 212 from each signal together in adder 406, the average power can be achieved using a right-shift operation as described above.

For more efficient implementation, in terms of chip area for example, the model coefficients or weights may be quantized into fixed point precision values. Similarly, the number of power proxies may be reduced. However, there is a tradeoff in accuracy.

Figure 5A:
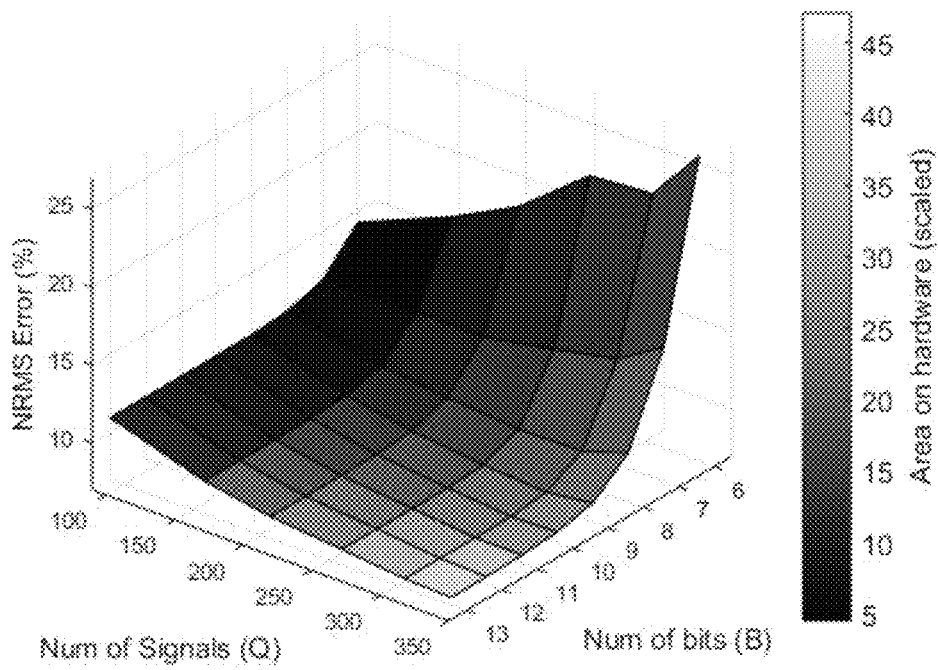
FIGS. 5A, 5B and 5C illustrate design tradeoffs for a particular circuit.
Figure 5B:
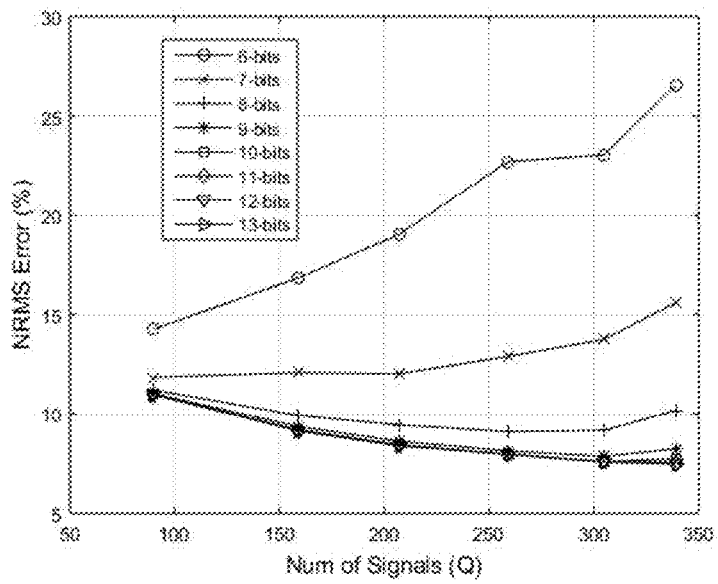
Figure 5C:
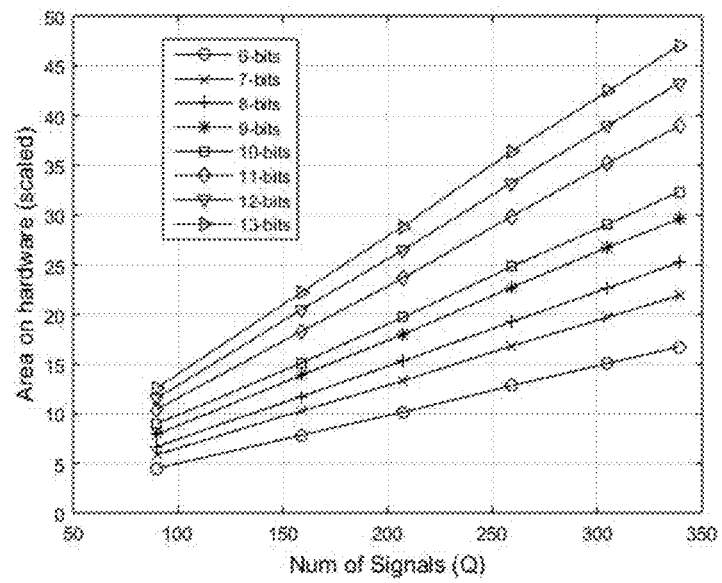

FIG. 5A illustrates the tradeoff for a particular circuit. Referring to FIG. 5A, it can be seen that the error between the power measured by the OPM and the simulated power increases as the bit width (B) for coefficient quantization is reduced or the number (Q) of power proxies is reduced. However, the required chip area is reduced as the bit width (B) for coefficient quantization is reduced or the number (Q) of power proxies is reduced. Such trade-off analysis can be used to find the final design target of OPM. The same information is presented in FIG. 5B and FIG. 5C. FIG. 5B shows the error as a function of the number of proxy signals, for various weight precisions. FIG. 5C shows the scaled area on the hardware as a function of the number of proxy signals, for various weight precisions.

The OPM may be implemented in a variety of circuits, including but not limited to, central processing units (CPUs), graphics processing unit (GPUs), neural processing units (NPUs) and system interconnects.

Figure 6:
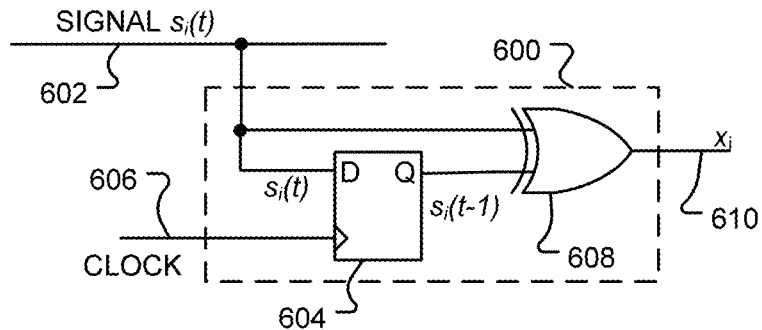
FIG. 6 shows an example a toggle generator, in accordance with various representative embodiments.

FIG. 6 shows an example embodiment of a toggle generator 600. A logic signal $s_i(t)$ (602) at time t is passed the data input of register 604 clocked by clock signal 606. The register may be D flip-flop, for example. The output from register 604, which corresponds to the previous input signal, $s_i(t-1)$, is combined in logic XOR ('exclusive or') gate 608 to produce toggle data $\{x_i\}$ (610).

Figure 7:
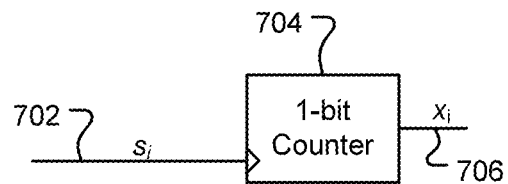
FIG. 7 shows a further example toggle generator, in accordance with various representative embodiments.

FIG. 7 shows a further embodiment of a toggle generator 700, in which input logic signal 702 ($s_i$) is passed to a 1-bit counter 704 to provide toggle data 706.

Figure 8:
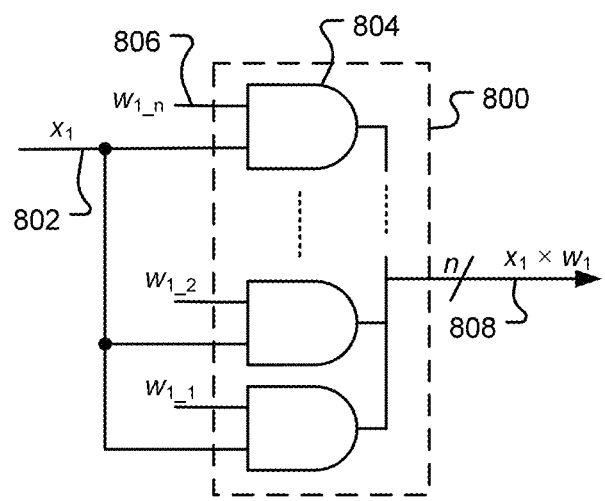
FIG. 8 shows a multiplier implemented as a multi-bit AND gate, in accordance with various representative embodiments.

FIG. 8 shows an embodiment in which a multiplier (210 in FIG. 2) is implemented as a multi-bit AND gate 800. In this embodiment of the multiplier, toggle data 802 is passed to each single-bit AND gate 804 where it is combined with one bit of the weight value $w_1$. In the example shown, weight value $w_1$ has n bits denoted as $w_{1\_1}, w_{1\_2}, \ldots w_{1\_n}$. Since the values of $\{x_i\}$ are either '1' or '0', the logical AND operation is equivalent to a multiplication and the n-bit output 808 is equal to the product of the toggle value and the weight value.

Figure 9:
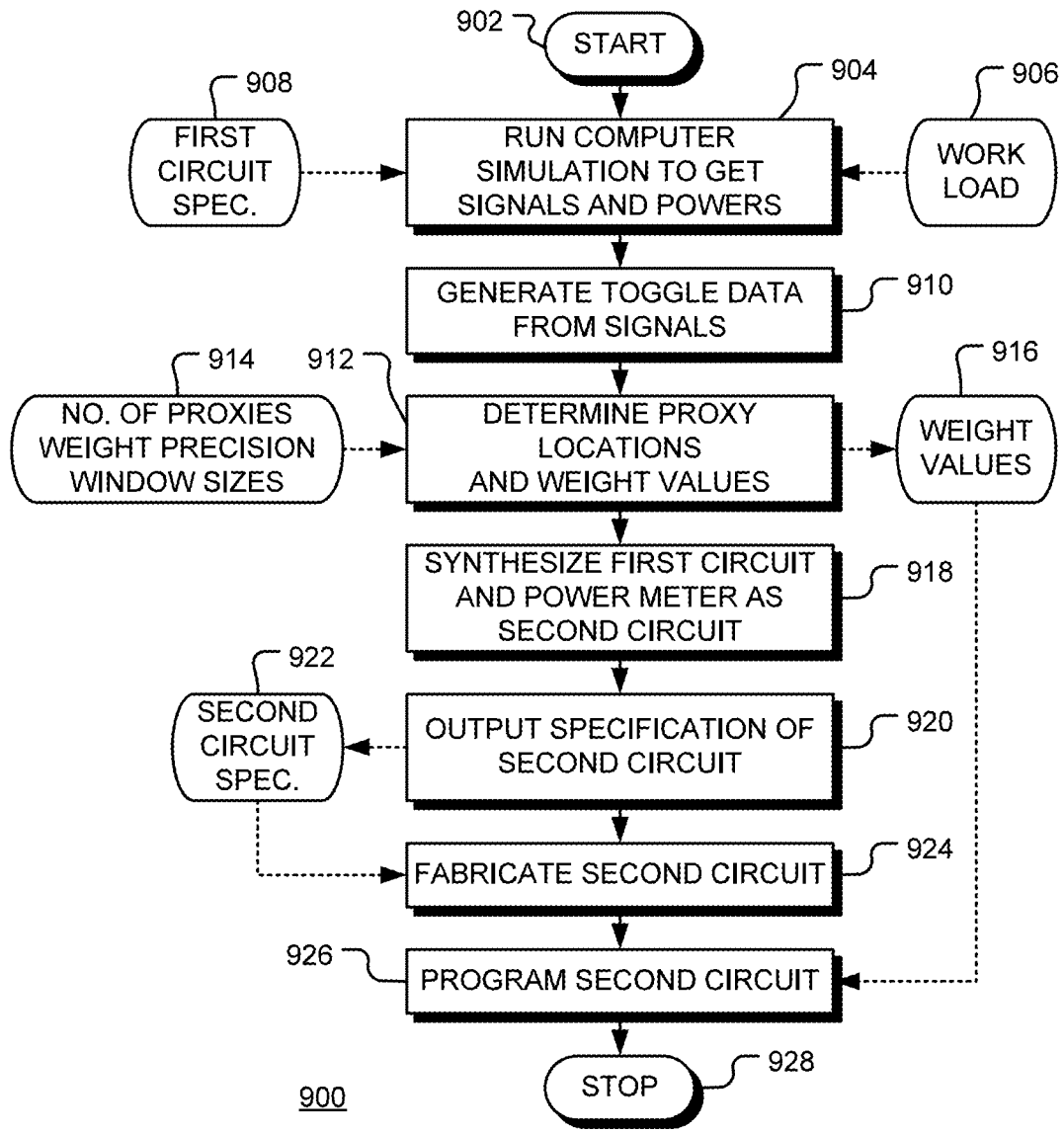
FIG. 9 is a flow chart of a method for automated design of a power meter, in accordance with various representative embodiments.

FIG. 9 is a flow chart of a method 900 for automated design and synthesis of a power meter, in accordance with various representative embodiments. Following start block 902, a computer readable specification of a first electronic circuit is processed in a computer simulation at block 904 to determine signals at a set of circuit locations in the first electronic circuit and corresponding electrical power usage in the first electronic circuit in a number of time windows. The simulation determines signals and powers generated by executing a designated workload 906 in a first circuit specified by specification 908. From the signals, toggle data corresponding to transitions in the determined signals in the number of time windows is generated at block 910. In an alternative embodiment, other signal traces, such as signal levels, may be generated at block 910.

From the toggle data and corresponding electrical power usage, a number of proxy locations are selected automatically at block 912. The number of proxy locations 914 may be designated by a user. At the same time, corresponding weight values 916 are determined. The proxy locations are a subset of circuit locations for which signals at the subset of circuit locations are indicative of the electrical power usage in the first electronic circuit. From the computer readable specification of first electronic circuit and proxy locations, a second electronic circuit is synthesized at block 918, and output at block 920 to second circuit specification 922. The second circuit includes both the first electronic circuit and a power meter circuit. The power meter circuit is configured to receive signals from the proxy locations of the first electronic circuit and produce a measurement of power usage in the first electronic circuit.

The second circuit may be fabricated at block 924 based on the specification 922. Finally, the weight values of the power meter circuit may be programmed at block 926. The method terminates at block 928.

The proxy locations are selected automatically and, at the same time, corresponding weight values are determined. The electrical power usage in the first electronic circuit is produced in the power meter circuit from a sum of the toggle data at the proxy locations weighted by the weight values. The weight values may be determined to a designated number of bits.

The power meter circuit may be configured to determine the electrical powers in the first electronic circuit as a function of the sum of the toggle data for the proxy locations weighted by the weight values.

In one embodiment, weight values are determined for estimating the electrical powers in the first electronic circuit from the toggle data at a first set of circuit locations. The proxy locations are then selected as the circuit locations weighted by a non-zero value.

The duration of the time windows may be designated by a user, for example.

A further embodiment of the disclosure provides an integrated circuit that includes a first circuit having a number of circuit locations and a power meter circuit. The power meter circuit is operationally coupled to the first circuit at proxy locations, where the proxy locations are a subset of the plurality of circuit locations. The power meter circuit includes toggle data generator circuitry for receiving signals from the proxy locations of the first circuit and generating toggle data therefrom and combiner circuitry for combining the toggle data in a first time window with a set of weight value to produce a measure of power usage in the first circuit as output. The time window includes a number of clock cycles of the first circuit.

The power meter also includes storage for toggle data in the first time window and storage for the set of weight values.

The combiner circuitry includes a number of multipliers, one for each proxy location and an adder. Each multiplier multiplies toggle data for a proxy location by a corresponding weight value to produce weighted toggle data. The adder is configured to sum the weighted toggle data to produce the measure of power usage in the first circuit.

The toggle data may take the form of a logic signal for each proxy location. In this case, a multiplier may include, for each proxy location and each bit of a corresponding weight value, a logic gate configured to perform a logical 'AND' operation between toggle data for the proxy location and a bit of the corresponding weight value.

In one embodiment, the toggle data generator circuitry includes a register for storing a prior signal for a proxy location and a logic gate configured to perform a logical 'exclusive or' (XOR') operation between the prior signal for the proxy location and a current signal for the proxy location to produce toggle data as output.

In a further embodiment, the toggle data generator circuitry includes a one-bit counter responsive to a signal from a proxy location and producing toggle data as output.

The combiner circuitry may be configured to aggregate toggle data over a second time window having a shorter duration than the first time window. In this case, the measure of power usage in the first circuit is a weighted sum of the aggregated toggle data.

The combiner circuitry may be configured to aggregate a weighted sum of the toggle data over a second time window having a shorter duration than the first time window. In this case, the measure of power usage in the first circuit is based on the aggregated weighted sum of the toggle data. The second time window may include $2^N$ clock cycles, in which case the combiner may include a shifter configured to produce an average of weighted sum of the toggle data by shifting the aggregated weighted sum of the toggle data by N binary places.

A further embodiment of the disclosure relates to a method for power measurement in a first circuit of an integrated circuit using a power meter circuit in the integrated circuit. The method includes receiving signals from a number of proxy locations in the first circuit for multiple clock cycles of the first circuit in one or more first time windows. Toggle data is produced for the proxy locations for the clock cycles in the one or more first time windows. For one or more first time windows, the toggle data from the proxy locations and the plurality of clock cycles are combined based on a set of weight values to provide a power usage signal for the first circuit. The proxy locations are a subset of locations in the first circuit.

The one or more first time windows may be overlapping time windows and combining the toggle data may include forming a sum of the toggle data weighted by a set of weight values.

In one embodiment, the toggle data for each proxy location may be averaged over clock cycles of a second time window to provide averaged toggle data. The power usage is than produced by forming a weighted sum of the averaged toggle data using the set of weight values.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the disclosure.

What is claimed is:

1. A method comprising:
processing, in a computer simulation, a computer readable specification of an electronic circuit to determine simulated signals at a set of circuit locations in a simulated electronic circuit and corresponding simulated electrical power usage in the simulated electronic circuit in a plurality of time windows;
deriving simulated toggle data from the simulated signals in the plurality of time windows;
automatically selecting, from the simulated toggle data and the corresponding simulated electrical power usage, a plurality of proxy locations, where the plurality of proxy locations is a subset of circuit locations for which simulated signals at the subset of circuit locations are indicative of the simulated electrical power usage in the simulated electronic circuit; and
synthesizing, from the computer readable specification and the selected plurality of proxy locations, a second electronic circuit comprising:
a first electronic circuit in accordance with the computer readable specification; and
a power meter circuit to receive signals from the selected plurality of proxy locations in the first electronic circuit and produce a measurement of power usage in the first electronic circuit.

2. The method of claim 1, where said automatically selecting the proxy locations includes determining weight values and estimating electrical power usage in the simulated electronic circuit as a sum of the simulated toggle data at the proxy locations weighted by the determined weight values.

3. The method of claim 2, where said automatically selecting the proxy locations includes determining said weight values to a designated number of bits.

4. The method of claim 2, where said power meter circuit sums toggle data of the signals from the proxy locations in the first circuit weighted by the weight values.

5. The method of claim 1, where said automatically selecting the proxy locations includes automatically selecting a designated number of proxy locations.

6. The method of claim 1, where said automatically selecting the proxy locations includes:
determining weight values for estimating the electrical power usage in the simulated electronic circuit, said estimating including summing the simulated toggle data for the circuit locations weighted by the weight values; and
selecting, as proxy locations, circuit locations weighted by a non-zero weight value.

7. The method of claim 1, further comprising designating a duration of a time window in the plurality of time windows.

8. The method of claim 1, where the simulated toggle data includes transition data of the simulated signals, level data of the simulated signals, or data derived therefrom.

9. An integrated circuit comprising:
a first circuit having a plurality of circuit locations; and
a power meter operationally coupled to the first circuit at proxy locations, where the proxy locations are a subset of the plurality of circuit locations, the power meter including:
toggle data generator circuitry to receive signals from the proxy locations of the first circuit and generate toggle data therefrom; and
combiner circuitry to combine the toggle data in a first time window with a set of weight values to produce a measure of power usage in the first circuit as output.

10. The integrated circuit of claim 9, where the time window comprises a plurality of clock cycles of the first circuit and where the power meter further includes:
storage for toggle data in the first time window; and
storage for the set of weight values.

11. The integrated circuit of claim 9, where said combiner circuitry includes:
a plurality of multipliers, one for each proxy location, to multiply toggle data for a proxy location by a corresponding weight value to produce weighted toggle data; and
an adder to sum the weighted toggle data to produce the measure of power usage in the first circuit.

12. The integrated circuit of claim 11, where said toggle data comprises a logic signal for each proxy location and where a multiplier of the plurality of multipliers includes:
for each proxy location and each bit of a corresponding weight value, a logic gate configured to perform a logical 'AND' operation between toggle data for the proxy location and a bit of the corresponding weight value.

13. The integrated circuit of claim 9, where said toggle data generator circuitry includes:
a register for storing a prior signal for a proxy location; and
a logic gate to perform a logical 'exclusive or' ('XOR') operation between the prior signal for the proxy location and a current signal for the proxy location to produce toggle data as output.

14. The integrated circuit of claim 9, where said toggle data generator circuitry includes:
a one-bit counter that responsive to a signal from a proxy location produces toggle data as output.

15. The integrated circuit of claim 9, where the combiner circuitry to aggregates toggle data over a second time window having a shorter duration than the first time window, and where the measure of power usage in the first circuit is a weighted sum of the aggregated toggle data.

16. The integrated circuit of claim 9, where the combiner circuitry aggregates a weighted sum of the toggle data over a second time window having a shorter duration than the first time window, and where the measure of power usage in the first circuit is an aggregated weighted sum of the toggle data.

17. The integrated circuit of claim 16, where the second time window includes $2^N$ clock cycles and where the combiner includes a shifter to produce an average of weighted sum of the toggle data by shifting the aggregated weighted sum of the toggle data by N binary places.

18. A method for power measurement in a first circuit of an integrated circuit, the method comprising:
in a power meter circuit of the integrated circuit:
receiving signals from a plurality of proxy locations in the first circuit for a plurality of clock cycles of the first circuit in one or more first time windows;
producing, from said signals, toggle data for the proxy locations for the plurality of clock cycles of the first circuit in the one or more first time windows; and
for one or more first time windows, combining the toggle data from the proxy locations and the plurality of clock cycles based on a set of weight values to provide a power usage signal for the first circuit, where the proxy locations are a subset of locations in the first circuit.

19. The method of claim 18, where the one or more first time windows are overlapping time windows.

20. The method of claim 18, where combining the toggle data includes forming a sum of the toggle data weighted by a set of weight values.

21. The method of claim 18, further comprising:
averaging the toggle data for each proxy location over clock cycles in a second time window to provide averaged toggle data; and
forming a weighted sum of the averaged toggle data using the set of weight values.

22. The method of claim 18, where the toggle data includes signal transition data or signal level data.

* * * * *